P. L. T. HÉROULT.
ELECTRIC FURNACE.
APPLICATION FILED OCT. 3, 1907.

908,407.

Patented Dec. 29, 1908.

2 SHEETS—SHEET 1.

WITNESSES:

INVENTOR:
By Attorneys

P. L. T. HÉROULT.
ELECTRIC FURNACE.
APPLICATION FILED OCT. 3, 1907.

908,407.

Patented Dec. 29, 1908.

2 SHEETS—SHEET 2.

WITNESSES:
Fred White
René Bruine

INVENTOR
Paul Louis Toussaint Héroult,
By Attorneys,

UNITED STATES PATENT OFFICE.

PAUL LOUIS TOUSSAINT HEROULT, OF LA PRAZ, FRANCE, ASSIGNOR TO SOCIÉTÉ ELECTRO METALLURGIQUE FRANCAISE, OF FROGES, ISERE, FRANCE.

ELECTRIC FURNACE.

No. 908,407.

Specification of Letters Patent.

Patented Dec. 29, 1908.

Application filed October 3, 1907. Serial No. 395,744.

*To all whom it may concern:*

Be it known that I, PAUL LOUIS TOUSSAINT HÉROULT, a citizen of the Republic of France, residing in La Praz, Savoie, France, have invented certain new and useful Improvements in Electric Furnaces, of which the following is a specification.

The present application is in part a continuation of a previous application No. 312,654 filed April 19, 1906, and is directed to certain improvements in stuffing boxes for electrodes of an electric furnace.

A stuffing box is provided through which the electrode is fed into the furnace as its end burns away, and which stuffing box is provided with a packing of conducting material through which the current is passed to the electrode. The packing material is preferably loose graphite, and a special shape of packing box is preferably employed to facilitate the feeding of the electrode through the packing.

The accompanying drawings illustrate embodiments of the invention.

Figure 1:
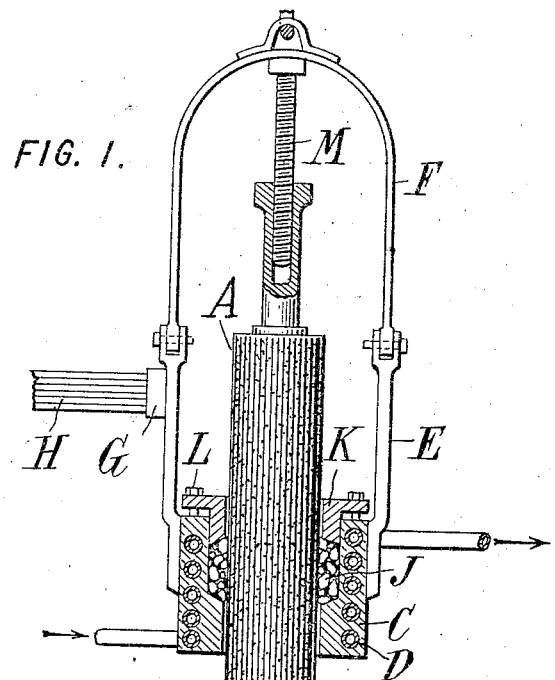
Figure 1:
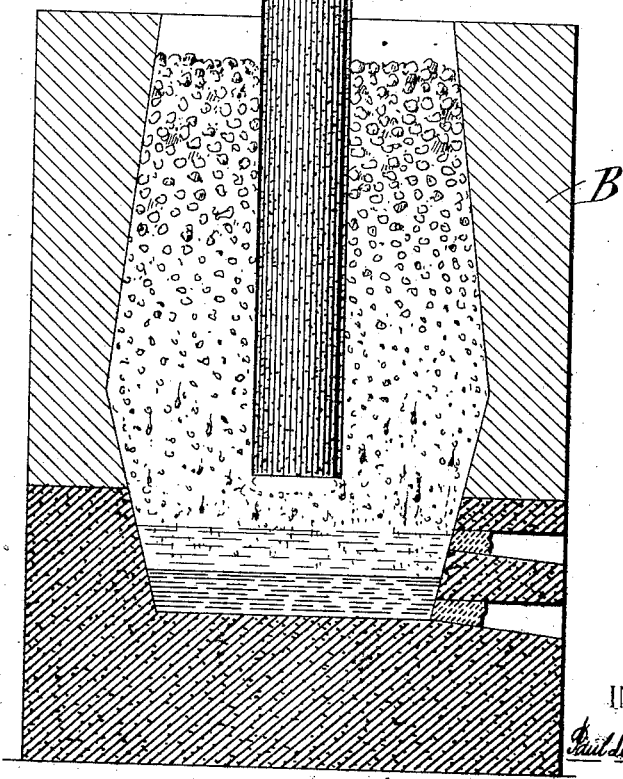
Figure 3:
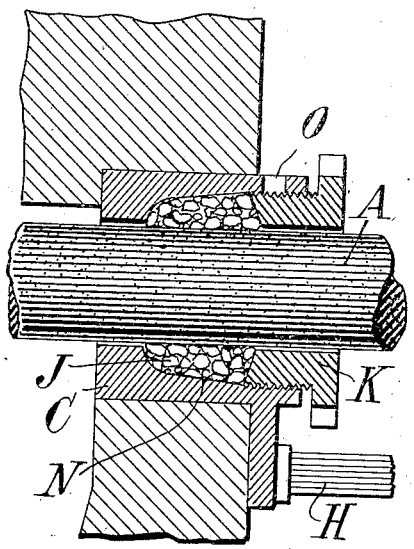
Figure 2:
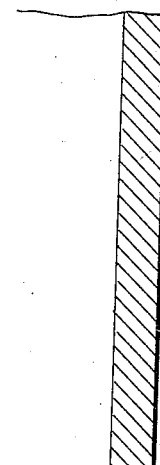
Figure 4:
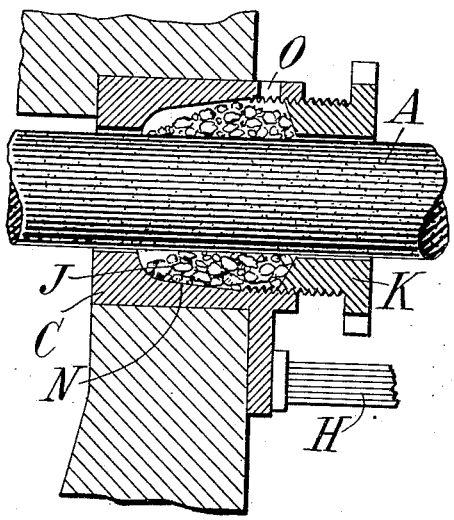
Figure 4:
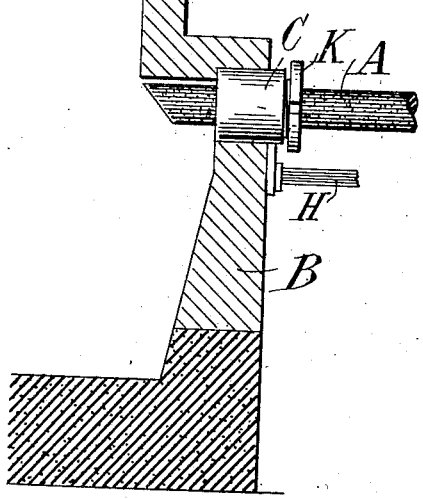

Figure 1 is a vertical section of a furnace employing one type of stuffing box; Fig. 2 is a half section showing the application of the stuffing box to another style of furnace, and showing also a modified form of stuffing box; Figs. 3 and 4 are enlarged sections of the stuffing box of Fig. 2.

Referring to the embodiment of the invention illustrated, the electrode A extends (vertically in the case of Fig. 1 and horizontally in the case of Fig. 2) into the crucible or body B of the furnace, at the bottom of which the molten product may be collected and tapped off. The electrode is shown as a simple circular rod of carbon, but it may equally well be made up of a number of parts, or be made of square or other cross-section. Referring especially to Fig. 1, the current is fed to a stuffing box C of copper, having a water circulating coil D cast therein for cooling it, the stuffing box being supported by arms E and a bail F connected to any suitable overhead support. For connecting the stuffing box C in the circuit, the arms E are provided with blocks G carrying the cables H. It is practically impossible to make the electrode perfectly true, and a certain amount of play is provided for it to slide freely through the stuffing box C. The electrode is held in position and at the same time the current is fed thereto by the introduction of a packing J of granular conducting material. For example graphite may be employed in the form of grains of varying sizes, so that the voids between the larger grains are filled by the smaller grains, and the entire mass makes a very compact, dense medium for conveying current to the electrode. The gland K fits loosely around the electrode and is forced down into the recess in the stuffing box by means of bolts L. The forcing in of the gland causes the granular packing to pack very closely so as to grip the electrode firmly and at the same time converts it into a dense mass so as to convey the current efficiently.

In order to adjust the electrode as its lower end burns or wears away, any suitable adjusting means may be provided, such for example as the jack screw M. In adjusting the electrode the bolts L will first be loosened and then a gradual downward pressure exerted. The regular feed is from overhead as usual by any suitable mechanism connected to the bail F.

When the gland is screwed up very tightly and under the strains arising from temperature changes, the electrode may be so firmly gripped by the packing as to make its adjustment difficult. The adjustment will be facilitated, however, by using the construction illustrated in Figs. 3 and 4. In this case the stuffing box C has its central space for receiving the packing enlarged toward the outer end as by tapering the inner wall N. Now when the gland K is slightly withdrawn endwise, the electrode A may be first pulled outward slightly, and the result will be to shift the packing material J to a position where it may expand radially, and where on account of the strains already in it, and on account of the lateral movement of the electrode, it breaks again into a more or less loose condition as shown in Fig. 4. Where the socket of the stuffing box is of the same cross-section throughout its length, such expansion of the packing material is not permitted.

The granular material may be filled into the packing box through an opening O at the upper side, and the gland K may be screwed into the box where the latter is circular as in Figs. 3 and 4. The connections to the electric cables H may be made through an arm of the stuffing box as shown.

What I claim is:—

1. The combination with an electrode for an electric furnace, of a stuffing box provided with packing of loose granular conducting material and enlarged toward its outer end so that the withdrawal of the electrode tends to loosen the packing, and means for passing current through said stuffing box to the electrode.

2. The combination with an electrode for an electric furnace, of a stuffing box having a recess surrounding the electrode and enlarged toward its outer end so that the withdrawal of the electrode tends to loosen the packing.

In witness whereof I have hereunto signed my name in the presence of two subscribing witnesses.

PAUL LOUIS TOUSSAINT HÉROULT.

Witnesses:
DOMINGO A. USINA,
FRED WHITE.